J. GOOD.
ROTARY VALVE.
APPLICATION FILED JAN. 20, 1916.
1,287,963.
Patented Dec. 17, 1918.
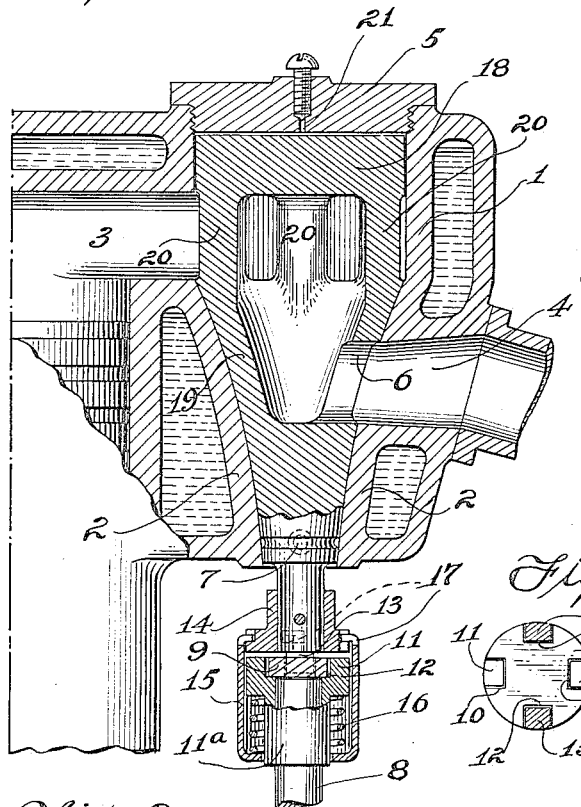
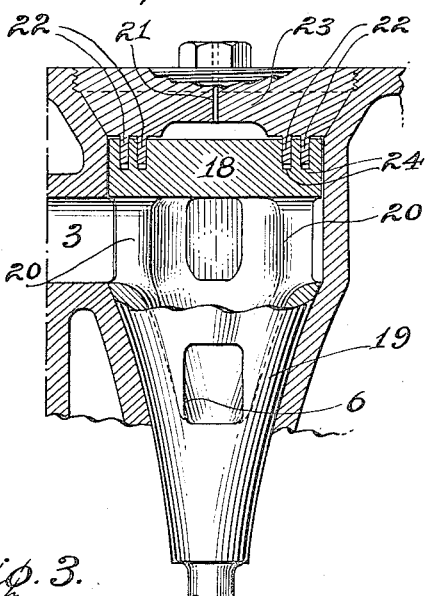
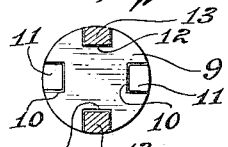
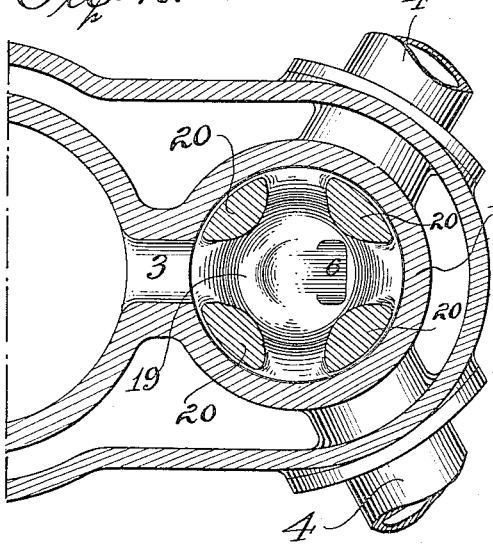
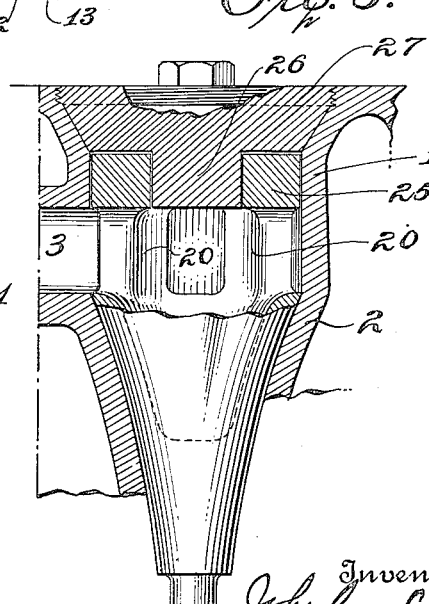
Inventor
John Good
By
Attorney

UNITED STATES PATENT OFFICE.

JOHN GOOD, OF BROOKLYN, NEW YORK.

ROTARY VALVE.

1,287,963.  Specification of Letters Patent.  Patented Dec. 17, 1918.

Application filed January 20, 1916. Serial No. 73,097.

*To all whom it may concern:*

Be it known that I, JOHN GOOD, a citizen of the United States, residing in the borough of Brooklyn, county of Kings, city and State of New York, have invented the following described Improvements in Rotary Valves.

The invention is an improvement in rotary valves for internal combustion engines, and is more particularly an improvement on the tractrix-curved rotary valve engine disclosed in my prior application, Serial No. 834,902, filed April 28, 1914, although the means constituting the present invention may be usefully applied in other relations. In the said application the rotary valve member engages its casing on a taper-curved seating surface which has a greater degree or curvature at its larger diameter than at its smaller diameter, and which is specifically the surface of generation of an equitangential tractrix revolved about the rotary axis of the valve. Such special curvature has the effect of distributing and maintaining an adequate heat transferring oil film between the valve member and casing, which not only preserves effective lubrication of the valve, but also permits the prompt discharge of heat from the rotary member to its casing, and through the latter to whatever heat dissipating means surrounds it, usually a water-jacket. By such heat-discharging facilities the rotary member is kept at a temperature so low as to be free from leakage as the result of thermal expansion or deterioration from warping, and thereby is enabled to perpetually preserve its own oil-film, notwithstanding wear from long continued use. It hence maintains a maximum efficiency which is permanent, at least for the life of the other engine parts. Under certain conditions, however, the said valve is subject to an objection arising, after long use, from the carbonizing of oil scraped up on the advancing edge of the rotary port, which builds up into a hard mass, ultimately constricting the passage and altering the timing. I have discovered that such clogging effect can be greatly reduced, if not entirely eliminated, by relieving some of the pressure on the oil-film as exerted by the rotary member, so that the latter does not thrust against its seat under the full pressure of the engine gases, and for this purpose I have deviced the counterbalancing means now to be described and which is effective to relieve part or all of the seating thrust without entailing any disturbance of the thermal characteristics of the valve or in any way impairing its effectiveness and superiority for the control of high pressures and temperatures.

In the accompanying drawing forming part of this specification,

Figure 1 represents an axial section of one form of embodiment of my invention;

Fig. 2 a transverse section of Fig. 1 on the level of the engine port;

Fig. 3 is a detail of the floating drive connection;

Fig. 4 is an axial section partly in elevation of a modified form; and

Fig. 5 a section of a further modification.

The new valve is shown in Figs. 1 and 2 as applied to the side of an engine cylinder in the location customary for puppet valves in T or L-head engines, but it can be applied to the engine cylinder in various ways, as will presently become apparent. The valve casing, which is cooled by a water-jacket, is constituted by a cylindrical wall 1 at its upper or wider part and a taper-curved wall 2 at its narrow part which forms the seating surface and is curved according to the formula of the tractrix curve as explained in the said prior application. The curvature of the tapered seating wall, it will be noted, is greatest at the wider part where it joins the cylindrical wall, and least at the narrow part, which is the characteristic of equi-tangential tractrix. The valve chamber formed by the cylindrical and taper-curved wall members is connected with the engine through a port 3, and with the manifolds through ports 4, the latter being formed, in the present case, through the tapered casing sidewall. The upper part of the casing is normally closed by a removable screw plug 5 which, in the present case, has no necessary function of sealing the valve chamber, and may therefore be applied without the usual provisions for tightness.

The rotary valve member is tapered on a curvature exactly corresponding to that of the tapered casing wall 2 on which it seats, and is provided with a port passage 6 cut through its curved wall to register with the casing ports 4, there being two casing ports in the present case designed to serve the intake and exhaust respectively. Means are provided, as shown at 7, for introducing a small quantity of oil to the seated surfaces for the establishment of the oil film therebetween, whereby heat present in the rotary valve member finds an ample and easy escape to the seat and the surrounding heat dissipating medium. The lower end of the valve member is connected to the valve shaft 8 which rotates it, the connecting means for this purpose being a form of floating drive mechanism adapted to prevent the exertion of sidewise pressure on the valve member by any of its driving agencies. In the present case the floating drive connection shown, consists of an intermediate floating disk or plate 9 provided with opposite notches 10 adapted to receive a pair of lugs 11 formed on the head 11$^a$ of the valve shaft, and a similar pair of notches 12 which receives depending lugs 13 on the head 14 pinned to the valve stem. The several lugs fit their notches loosely, so that a considerable disalinement of the valve shaft from the valve axis is permitted without imparting any lateral pressure to the valve itself or disturbing the rotary action. The opposing drive-heads 11$^a$ and 14 are embraced by a housing 15 and urged toward each other by the pressure of a spring 16 thrusting between the head 11$^a$ and the inturned flange of the housing 15. The upper end of the housing engages the head 14 on the valve-stem by a bayonet joint connection, as indicated at 17, so that it may be readily removed and the spring pressure released whenever desired. The pressure of the said spring 16 acts in the direction to urge the valve member upon its seat, but has no necessary function in this capacity, as will presently be apparent, nor is the use of the floating drive connection just described an essential requisite to the operation of the valve, since careful alining of the parts and other expedients may be resorted to for preserving, so far as possible, a condition of symmetrical wear between the sliding surfaces of the rotary member and its seat. The curved taper conduces to uniform and equal wear, which by preserving the oil film condition, prolongs indefinitely the period of maximum efficiency.

The engine side of the rotary valve member, being constantly in open communication with the cylinder, is subject to the engine pressure, but thrust thereby upon the valve-seat is prevented or counteracted by an auxiliary pressure surface formed on the valve-member itself and of sufficient area to balance the whole or such part of the seating thrust as may be desired, the remaining unbalanced portion being retained in such degree as may be necessary to prevent the member from jumping from its seat. The pressure surface referred to is formed in the present case by the under side of a roof-like part 18 connected with the seated part (19) of the valve member by means of a series of relatively thick and symmetrically disposed tie-posts 20, the spaces between the posts forming the communication from the engine port 3 to the interior of the valve member whereby the pressure may act in opposite directions thereon. The peripheral wall of the pressure member 18 is cylindrical and disposed concentrically within a cylindrical chamber in the upper part of the valve-casing, fitting such chamber closely but not in actual rubbing contact with the wall surface thereof, so that there is formed between said member and chamber wall a very narrow crevice, so narrow as to prevent appreciable escape of the engine gases past the said pressure member. This pressure-sealing effect may be obtained by providing a difference in radii of the member 18 and its chamber of about .002 inch, and holding the said member accurately to the central axis of the chamber, which is the function of the tapered seat. The crevice thus formed may be further narrowed by the deposit of carbon upon the opposing crevice-forming surfaces, for which purpose it is desirable to cut a very fine screw thread on one or both of said surfaces to which the carbon will become firmly anchored, or the crevice can be initially made of equal thinness by careful grinding. The uniform thinness of the crevice and the rotary motion produces a certain coaction between the pressure member 18 and its surrounding chamber wall, which is effective in sealing the joint without lubrication, that is to say, without an interposed film of oil. The relation may properly be termed a dry running and pressureless or imperfect contact, the parts being free from frictional wear and therefore capable of maintaining effectiveness as pressure sealing means so long as their concentricity is preserved. Inasmuch as these sealing surfaces are parallel with the rotary axis of the valve and displacement of the valve member from the wear of its seat can take place only in that direction, it is evident that the said sealing means preserves a maximum effectiveness throughout the life of the valve.

The tapered seat is preserved at a desirably and uniformly low temperature by virtue of its oil film connection with the water jacket, and the several tie-posts 20 unite the pressure member 18 to the seat by such an aggregate cross-sectional area of solid metal, the pressure member itself being also relatively massive, that the entire structure of the valve member partakes of the relative coolness of the seated surface. It is for this reason that the tie-posts 20 are thick and formed with tapered junctions with the valve parts 18 and 19 at their ends, and they are also integral with the valve member as shown, so that the temperature gradient from one end of the valve to the other is desirably low at all times, the heat which the pressure member and tie-posts receive being transferred to the cooled seat as rapidly as it can be received from the engine gases. It will be evident from a comparison of the projected areas of the seated part of the valve member and of the pressure surface afforded by the part 18, that a substantial balance is present in the form illustrated and the valve is seated wholly by the pull of the spring 16.

Such engine gas as may, in the lapse of time, find its way through the crevice into the space above the pressure member 18 is vented to the atmosphere through a screw-controlled vent-hole 21, or through the seat of the screw-plug which need not fit tightly, but this gas may be allowed to accumulate in this space if desired, controlled by the screw, and so as to increase the seating thrust if needed. Ordinarily, however, the relation of the balancing pressure areas will be selected to provide proper thrust and without need for subsequent change, the seating thrust, in any event, being less than the full engine pressure and thereby serving to overcome the port clogging effect above described.

Fig. 4 illustrates exactly the same construction as already described, except for the addition to the pressure sealing crevice of a labyrinthic crevice formed by a series of concentric rings 22 on the screw-plug 23 coacting with a corresponding series of annular grooves 24 in the head of the pressure member 18, and without lubrication. In the case of extreme pressures, or a relatively wide clearance between the pressure member and its chamber, this form of labyrinth packing serves to assure the sealing effect without unduly enlarging any of the parts. In this case the screw-plug 23 has a coned seat upon the entrance to the valve-chamber for obvious reasons. The modified form of Fig. 5 illustrates a method of reducing the counterbalancing action by diminishing the area of the counter balancing pressure surface. In this form the pressure member 25 which is fitted in dry running pressureless contact with the wall 1 of the valve-casing as above, has the shape of an annulus, and a cylindrical concentric extension 26 of the screw-plug 27 projects into the annulus, also fitting the same in dry running pressureless contact. Thereby the effective area of the pressure member 25 is reduced by an amount equivalent to the area of the circular plug extension 26, as will be evident. And it will also be evident that the area of said circular extension may be varied to suit requirements. In both forms shown by Figs. 4 and 5, it will be apparent that the heat imparted to the counterbalancing means is rapidly and effectively transferred to the seated part 19 whence it finds an immediate escape by virtue of the uniform oil-film connection to the water-jacket, in consequence of which the said counterbalancing means, although subjected to the intense heat of combustion, cannot attain a temperature likely to affect them or the valve injuriously. The continuous and prompt removal of heat from the said counterbalancing members through the oil-film seat surfaces of the valve, constitute the essential substance of my invention, and from the foregoing explanation I believe it will be apparent to those skilled in this art that the dissipation of heat in this manner can be applied in various different ways to different types of rotary valves; all of which forms of application are intended to be included in the claims which follow.

Claims:

1. An internal combustion engine valve comprising a valve casing having a tapered and lubricated seat, a rotary valve member seated thereon of relatively massive, integral metallic structure, combined with means for balancing axial thrust of the member on its seat comprising a chamber in the casing concentric to the axis of said seat, a pressure member on the valve member having dry-running pressure-sealing relation to the wall of said chamber and exposed to the engine pressure in balancing relation to said thrust, the structure of said valve member providing an ample escape path for heat from said dry-running pressure-member, and circulatory means for abstracting heat from the valve member through the lubricated seat thereof.

2. In an internal combustion engine valve, the combination with a valve casing and rotary valve member having an axially tapered seat therein, of means for balancing axial thrust upon said seat comprising a pressure member on the valve member, and a balancing chamber in the casing, the opposing surfaces of said pressure member and chamber being in imperfectly-contacting, pressure-sealing relation and parallel with the axis of said valve member, whereby they maintain said pressure-sealing relation after wearing of the said tapered seating surfaces.

3. An internal combustion engine valve comprising a cooled valve casing, a rotary valve member having a seat on said casing and means for balancing the engine pressure upon the seat comprising a balancing chamber, a pressure member forming part of said valve member and having a surface closely opposed to, but not in frictional contact with the surface of the wall of said chamber and adapted to prevent escape of pressure without lubrication, and having also a metallic connection to the seated part of said member of relatively large cross-section, and affording free escape for heat from said head.

4. An internal combustion engine valve comprising a valve casing, a rotary valve member having a lubricated tapered seat thereon and provided with means for dissipating heat from such seat, in combination with a balancing chamber, a pressure-member on the valve member subjected to the engine pressure in balancing relation to said seat and having at its peripheral surface in dry-running, non-wearing and pressure-sealing engagement with the wall of said chamber and a metallic connection between said pressure member and the cooled seat of the valve member of relatively large cross-section, adapting such head to keep a low temperature during operation.

5. An internal combustion engine valve comprising in combination a valve casing and rotary valve member seating the one upon the other in the surface of generation of an equi-tangential tractrix curve, the casing seat being adapted to dissipate heat, and means for balancing end thrust upon the seat comprising a pressure-member on the valve-member, having dry-running, pressure-sealing engagement with a chamber in the casing and having a discharge path for heat to said seat adapted to preserve said pressure member at relatively low temperature.

In testimony whereof, I have signed this specification.

JOHN GOOD.